United States Patent
Finke

(10) Patent No.: US 12,499,790 B2
(45) Date of Patent: Dec. 16, 2025

(54) EMULATING A SPOTLIGHT THAT IS PARTIALLY COVERED BY A MASK

(71) Applicant: MA Lighting Technology GmbH, Waldbüttelbrunn (DE)

(72) Inventor: Matthias Finke, Hochheim am Main (DE)

(73) Assignee: MA Lighting Technology GmbH, Waldbüttelbrunn (DE)

( * ) Notice: Subject to any disclaimer, the term of this patent is extended or adjusted under 35 U.S.C. 154(b) by 0 days.

(21) Appl. No.: 18/024,368

(22) PCT Filed: Aug. 18, 2021

(86) PCT No.: PCT/AT2021/060286
§ 371 (c)(1),
(2) Date: Mar. 2, 2023

(87) PCT Pub. No.: WO2022/047511
PCT Pub. Date: Mar. 10, 2022

(65) Prior Publication Data
US 2023/0260432 A1   Aug. 17, 2023

(30) Foreign Application Priority Data
Sep. 2, 2020  (AT) .............. A 50745/2020

(51) Int. Cl.
*G09G 3/00* (2006.01)
*H05B 47/18* (2020.01)

(52) U.S. Cl.
CPC ............. *G09G 3/001* (2013.01); *H05B 47/18* (2020.01); *G09G 2340/10* (2013.01)

(58) Field of Classification Search
CPC ..... G09G 3/001–003; G09G 3/02–025; G09G 5/18; G09G 5/36–42;
(Continued)

(56) References Cited

U.S. PATENT DOCUMENTS

| 6,188,933 B1 * | 2/2001 | Hewlett ............... G03B 21/008 |
| | | 359/291 |
| 11,276,235 B2 | 3/2022 | Folgoas et al. |

(Continued)

FOREIGN PATENT DOCUMENTS

| GB | 2 342 466 A | 4/2000 |
| WO | WO 2019/115951 A1 | 6/2019 |

OTHER PUBLICATIONS

Elation Professional, Emotion user manual, www.elationlighting.com, 2015.

*Primary Examiner* — Keith L Crawley
(74) *Attorney, Agent, or Firm* — Tiajoloff & Kelly LLP

(57) ABSTRACT

A method and a device emulate a headlamp that is partially covered by a mask. In order to make it possible to implement a lighting design that is independent of any pre-settings in the headlamps using inexpensive and readily available lighting components while retaining existing lighting control protocols, a two-dimensional pattern is retrieved from a pattern memory in accordance with a pattern channel value of a lighting control protocol and is transformed in accordance with transformation channel values of the lighting control protocol. After transforming the two-dimensional patters, the resulting transformed pattern is converted into a raster image, the pattern pixels of which are brighter by at least 20% than the remaining pattern-free pixels. The raster image is output as a headlight using a digital projector.

19 Claims, 1 Drawing Sheet

(58) Field of Classification Search
CPC ....... G09G 2340/10; H04N 9/31–3138; H04N 13/10–194; H05B 47/10–195
See application file for complete search history.

(56) References Cited

U.S. PATENT DOCUMENTS

| | | |
|---|---|---|
| 2002/0113752 A1 | 8/2002 | Sullivan et al. |
| 2002/0181070 A1* | 12/2002 | Hewlett ............. G02B 26/0833 348/E5.142 |
| 2003/0025649 A1 | 2/2003 | Willson |
| 2004/0017164 A1 | 1/2004 | Belliveau |
| 2006/0146393 A1* | 7/2006 | Hewlett ................ G09G 3/346 359/291 |
| 2007/0242162 A1 | 10/2007 | Gutta et al. |
| 2010/0201702 A1 | 8/2010 | Franik et al. |
| 2012/0274626 A1 | 11/2012 | Hsieh |
| 2013/0193855 A1* | 8/2013 | Bauer .................... H05B 47/18 315/151 |
| 2014/0146080 A1* | 5/2014 | Ivashin ................ H04N 9/3185 345/629 |
| 2014/0192080 A1* | 7/2014 | Hunt ........................ H04N 5/20 345/647 |
| 2019/0373228 A1* | 12/2019 | Okada .................. H04N 9/3147 |

\* cited by examiner

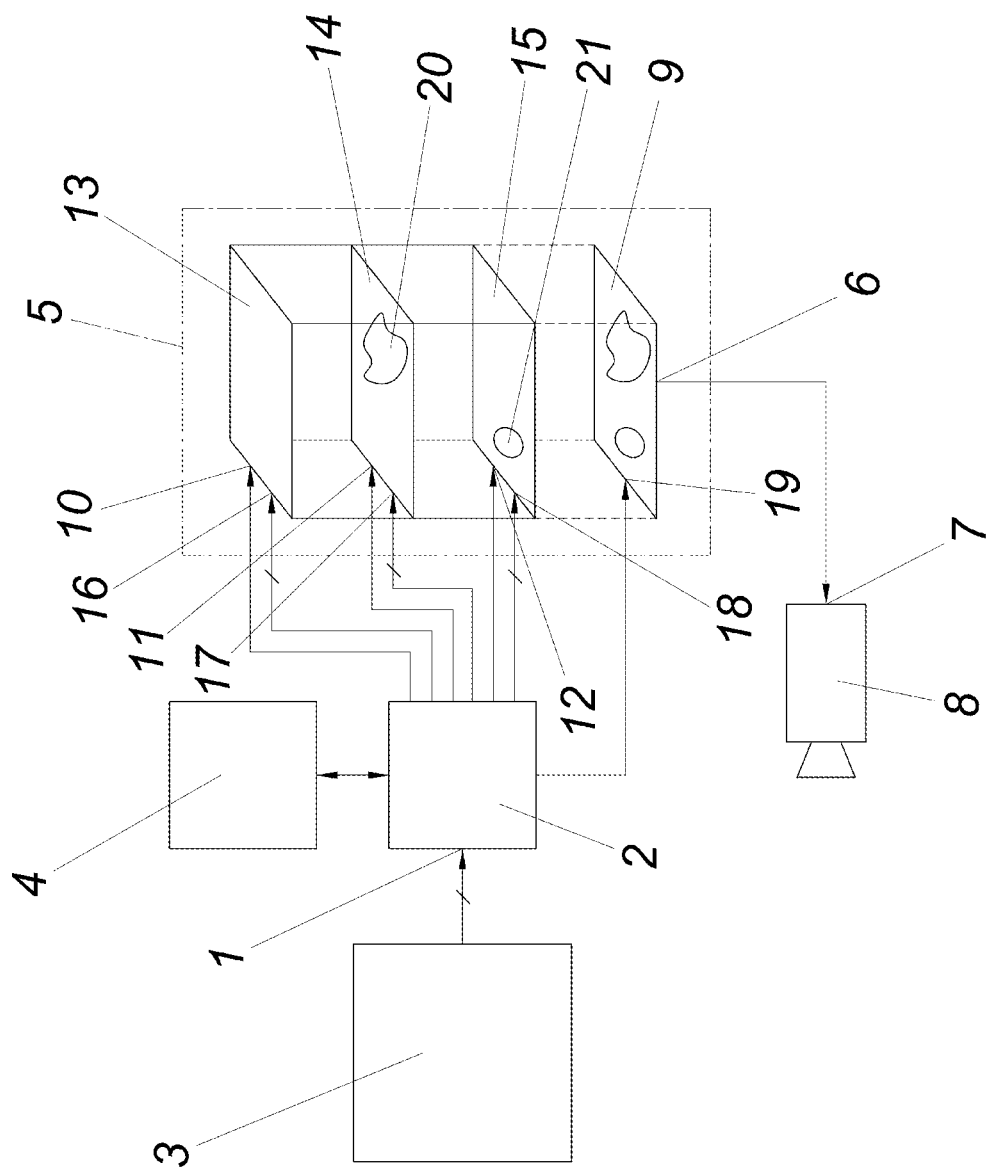

EMULATING A SPOTLIGHT THAT IS PARTIALLY COVERED BY A MASK

TECHNICAL FIELD

The system described herein relates to emulating a spotlight that is partially covered by a mask.

BACKGROUND

To generate atmospheric light beams, it is known in the field of event technology to control head-mounted spotlights or scanners using a lighting control protocol via lighting control consoles. In addition to deflecting the light beam, it is also possible to change the brightness of the light beam emerging from the spotlight, as well as a color of the light beam with the aid of color change systems or change a shape of the light beam with the aid of masks. The advantage is that all spotlights can be operated via a uniform control system, making it easy to implement even complex lighting scenarios with many light sources. However, not least because of the physical limitations of the spotlights used in this process in terms of limited actuating speeds and travels and in terms of a limited selection of colors and shapes specifically predefined for each application, users are restricted in their lighting design options because only settings predefined in the spotlights can be called up via the lighting technology control protocol.

SUMMARY OF THE INVENTION

The system described herein retains existing lighting control protocols and makes it possible to implement a lighting design independent of any presettings in the spotlights while using inexpensive and readily available lighting components.

In the system described herein, a two-dimensional pattern is retrieved from a pattern memory as a function of a pattern channel value of a lighting control protocol and is transformed as a function of transformation channel values of the lighting control protocol, after which the transformed pattern is converted into a raster image, the pattern pixels of which raster image are brighter by at least 20% than the remaining pattern-free pixels, and the raster image is output via a digital projector acting as a spotlight.

As a result of these features, on the one hand, it is possible to control commercially available digital projectors on the basis of standardized light control protocols which do not have to be adapted for this purpose and can therefore be used unchanged, and on the other hand, it is possible to transform various light parameters such as brightness, shape and color of the light beam emitted by the projector in real time. For example, light control protocols according to the ArtNet standard, the DMX512 standard or similar can be used. In order to transform the patterns retrieved from the pattern memory with regard to the brightness, shape, color, etc. of the patterns in terms of simple controllability, separate bus channels can be provided for the transformation channel values. The raster image can be composed additively of the transformed pattern and a background image with lower brightness, preferably a black image area. In that pattern pixels of the output raster image are at least 20%, preferably at least 50%, brighter than the remaining pattern-free pixels, a delineated spotlight beam can be perceived by viewers through the projected raster image. In order to provide the user with transitions between different projected raster images that are perceived as natural, following the delays that occur when changing physical masks in the context of conventional lighting technology systems, an interpolation between the channel values can be performed when changing between two values of a channel of the lighting control protocol, where interpolated channel values are used for the transformation for each time step of a predetermined time interval and a raster image generated on the basis of the interpolated channel values is output.

In order to allow an even greater creative freedom of the lighting scenarios while maintaining an easy controllability of the projector, several pattern channels, each assigned to one image plane, can be provided, wherein the transformed patterns of the individual image planes are converted into a common raster image. In this way, for example, several basic patterns can also be adapted and superimposed in planes to generate the generated image. In this case, the individual patterns are transformed independently of each other using the transformation channel values assigned to the respective image plane and then mixed to form a common sum image by combining the individual planes. Each plane is therefore assigned a pattern channel for selecting a pattern from the pattern memory and one or more transformation channels which together define the partial image of the plane.

In the event that several raster images are output via one digital projector each, wherein the respective digital projectors are acting as spotlights, it must be ensured that synchronous image output is possible despite possibly different reaction times of the individual projectors. This is particularly necessary when different, readily available projectors that are not coordinated with each other are used. With this in mind, it is proposed that the raster image signal for one projector is delayed by a difference between the slowest reaction time of all projectors and the reaction time of the one projector. The delay value required for this can, for example, also be transferred to the device according to the system described herein via a channel of the lighting technology control protocol.

The system described herein also relates to a device for emulating a spotlight partially covered with a mask, having an input for a lighting control protocol, where a pattern memory for two-dimensional image patterns and an image mixer connected to the pattern memory and controlled as a function of the channel values of the lighting control protocol are provided, the sum image output of which image mixer is connected to the image input of a digital projector acting as a spotlight. The image mixer can preferably have different inputs corresponding to the pattern parameters, such as a pattern size input, a pattern positioning input, a pattern brightness input or a pattern color input. The device according to the system described herein can be controlled with conventional lighting control consoles via common lighting control protocols, such as DMX512 or ArtNet, so that lighting scenarios can be transformed in real time by the image mixer depending on the channel values of the lighting control protocol. It is useful that the raster image is not prefabricated and stored in a memory, but is calculated and output in real time by the image mixer, which can be a graphics card, for example. This means that transformation channels can also be provided with channel value that specify a particular animation of the pattern without the channel value having to change continuously for the animation. In this way, animations such as a rotation, translation, scaling, or even a blur that changes over time can be calculated in high quality without delay, regardless of the transmission conditions on the lighting control bus. To achieve good illumination results, it is recommended that the digital projector has a luminous intensity of at least 3000 ANSI lumens. The contrast ratio of the projector can preferably be at least 5000:1.

In order for the image output by the digital projector to be perceived by viewers as a delineated beam, as would be output by conventional spotlights, it is recommended that the difference in brightness between pattern pixels and pattern-free pixels in the sum image output be at least 20%, preferably at least 50%.

In order to further increase the diversity of different lighting scenarios that can be transformed in real time, the device can have several pattern channel inputs for the lighting technology control protocol, where each pattern channel input is assigned an image plane mixed with the sum image of the image mixer. This allows the user to perform creative lighting designs due to the plurality of planes that can be combined with each other to form a sum image, each with different transformation values. The image mixer can also have one or more transformation channel inputs for the lighting control protocol for each image plane. In addition, the image mixer can have one or more plane-independent transformation channel inputs that allow the sum image to be transformed before the sum image is output.

BRIEF DESCRIPTION OF DRAWINGS

The subject matter of the system described herein is shown in the drawings by way of example, wherein the sole drawing is a schematic diagram that shows a device that emulates a spotlight partially covered with a mask.

DETAILED DESCRIPTION OF VARIOUS EMBODIMENTS

A device for carrying out a method according to the system described herein for emulating a spotlight partially covered with a mask has an input 1 for a lighting technology control protocol. A bus interface 2 may be provided which, on the one hand, receives control signals from a control unit 3, e.g. a lighting control panel, and, on the other hand, connects a pattern memory 4 for two-dimensional image patterns to an image mixer 5 in such a way that the latter can be controlled as a function of the channel values of the lighting control protocol. The image mixer 5 has a sum image output 6 which is connected to the image input 7 of a digital projector 8 acting as a spotlight, so that the sum image 9 generated in the image mixer 5 as a function of the channel values of the lighting control protocol can be output via the digital projector 8.

To generate a sum image 9, two-dimensional patterns are retrieved from the pattern memory 4 as a function of the respective pattern channel values of the lighting control protocol and transformed in real time in the image mixer 5 as a function of transformation channel values of the lighting control protocol. The image mixer 5 may be a graphics card for this purpose.

As shown by way of example in the drawing, the image mixer 5 can have a number of pattern inputs 10, 11, 12 via which patterns can be loaded from the pattern memory 4 into individual image planes 13, 14, 15 using the bus interface 2 on the basis of the channel values of the pattern channels. Each pattern channel input and each pattern input 10, 11, 12 is assigned an image plane 13, 14, 15 which is mixed with the sum image 9. The transformation of the respective patterns of each image plane 13, 14, 15 supplied to the image mixer 5 via the pattern inputs 10, 11, 12 takes place as a function of transformation channel values which are transferred to the image mixer 5 via corresponding transformation channel inputs 16, 17, 18. In addition, the image mixer 5 can have, for example, a plane-independent transformation channel input 19, which enables the sum image 9 to be transformed before the sum image 9 is output. In the exemplary embodiment shown here, the image plane 13 can be a black pattern as a background plane. For example, a channel value is specified via the transformation channel input 17 assigned to the image plane 14 in order to calculate a scaling of the pattern 20 in the image plane 14. Similarly, channel values can be specified via the transformation channel inputs 16, 18 assigned to the remaining image planes 13, 15, which, for example, cause a rotation of the pattern 21 or a change in the width/length ratio of the pattern 21. Finally, the plane-independent transformation channel input 19 can be used to specify a channel value which, for example, causes a blurring of the sum image 9 combined from the respective transformed image planes 13, 14, 15 before the sum image 9 is output via the sum image output 6.

The invention claimed is:

1. A method for emulating a spotlight partially covered with a mask, comprising:
    retrieving a two-dimensional pattern from a pattern memory as a function of a pattern channel value of a lighting control protocol of a lighting control unit;
    transforming the two-dimensional pattern as a function of transformation channel values of the lighting control protocol so as to provide a first transformed pattern;
    transforming a second two-dimensional pattern as a function of transformation channel values of the lighting control protocol so as to provide a second transformed pattern;
    combining and converting the first and second transformed patterns into a raster image of pixels in an image mixer such that the transformed first and second patterns are present as pattern pixels in said raster image, the pattern pixels of the raster image being brighter by at least 20% than pixels wherein the first and second transformed patterns are not present;
    transmitting the raster image from the image mixer as a digital video output signal to a digital projector, said digital projector having an image input receiving said digital video output signal, said digital projector being configured to display digital video signals received at the image input thereof as pixels of light; and
    outputting the raster image of the digital video output signal via the digital projector so that the digital projector acts as a spotlight and projects both of the first and second transformed patterns simultaneously on the same digital projector.

2. The method according to claim 1, wherein a plurality of pattern channels are provided, each of which is assigned to an image plane and transformed to provide the transformed patterns, and wherein the transformed patterns of each of the image planes are converted into a common raster image that is the raster image of the digital video output signal.

3. The method according to claim 1, wherein the digital projector is one of a plurality of digital projectors, and the raster image is one of a plurality of raster images that are each output as a respective digital video signal to respective digital projectors of said plurality of digital projectors so that each of the digital projectors acts as spotlight, and wherein the digital video signal for one of the digital projectors is delayed by a difference between a reaction time of said digital projector and a slowest reaction time of a slowest one of the digital projectors.

4. A device for emulating a spotlight partially covered by a mask, comprising:
an input for a lighting control protocol;
a pattern memory storing two-dimensional image patterns; and
an image mixer connected to the pattern memory and controlled as a function of channel values of the lighting control protocol,
wherein the image mixer receives and combines at least two image patterns to derive a sum image output, and then outputs the sum image output as a digital video signal configured to be received by an image input of a digital projector so as to cause the digital projector to act as a spotlight and outputs both of the image patterns combined in the sum image output simultaneously on the same digital projector; and
wherein the image mixer comprises a graphics card.

5. The device according to claim 4, wherein a brightness difference between pattern pixels and pattern-free pixels in the sum image output is at least 20%.

6. The device according to claim 4, wherein a plurality of pattern channel inputs are provided for the lighting control protocol and wherein each pattern channel input is assigned an image plane mixed with the sum image output of the image mixer.

7. The method according to claim 2, wherein the digital projector is one of a plurality of digital projectors, and the raster image is one of a plurality of raster images that are each output as a respective digital video signal to respective digital projectors of said plurality of digital projectors, so that each of the digital projectors acts as spotlight, and wherein the digital video signal for one of the digital projectors is delayed by a difference between a reaction time of said digital projector and a slowest reaction time of a slowest one of the digital projectors.

8. The device according to claim 5, wherein a plurality of pattern channel inputs are provided for the lighting control protocol and wherein each pattern channel input is assigned an image plane mixed with the sum image output of the image mixer.

9. The method according to claim 1, wherein the lighting control protocol is an ArtNet standard or a DMX512 standard.

10. The method according to claim 2, wherein each of the transformation channel values is applied to each of the pattern channels and wherein at least one of the transformation channel values controls at least one of:
scaling of the two-dimensional pattern,
rotation of the two-dimensional pattern, or
a change in length/width ratio of the two-dimensional pattern.

11. The method according to claim 10, further comprising:
applying a plane-independent transformation to the raster image prior to outputting the raster image.

12. The method according to claim 11, wherein the plane-independent transformation causes a blurring of the raster image.

13. The device according to claim 4, wherein the lighting control protocol is an ArtNet standard or a DMX512 standard.

14. The device according to claim 6, wherein each of the transformation channel values is applied to each of the pattern channels and wherein at least one of the transformation channel values controls at least one of:
scaling of each of the two-dimensional patterns,
rotation of each of the two-dimensional patterns, or
a change in length/width ratio of each of the two dimensional patterns.

15. The device according to claim 14, wherein a plane-independent transformation is applied to the sum image prior to outputting the sum image.

16. The device according to claim 15, wherein the plane-independent transformation causes a blurring of the sum image.

17. The method of claim 1, wherein the image mixer includes a graphics card outputting the digital video signal.

18. A method for emulating a spotlight partially covered with a mask, said method comprising:
retrieving a two-dimensional pattern from a pattern memory based on a pattern channel value of a lighting control protocol of a lighting control unit;
transforming the two-dimensional pattern as a function of transformation channel values of the lighting control protocol of the lighting control unit so as to provide a transformed pattern;
converting the transformed pattern into a raster image using a graphics card, wherein the raster image is a field of pixels made up of pattern pixels corresponding to the transformed pattern and pattern-free pixels that do not correspond to the transformed pattern, the pattern pixels of the raster image being brighter by at least 20% than the pattern-free pixels of the raster image;
outputting the raster image from the graphics card as a digital video output signal;
receiving the digital video output signal in an image input of a digital projector, said digital projector being configured to display a field of pixels each selectively projecting light based on the digital video signals received at the image input; and
outputting the raster image of the digital video output signal via the digital projector as a corresponding field of pixels so that the digital projector acts as a spotlight;
retrieving another two-dimensional pattern from a pattern memory based on one of a plurality of pattern channel values of the lighting control protocol of the lighting control unit;
transforming said another two-dimensional pattern as a function of transformation channel values of the lighting control protocol of the lighting control unit so as to provide another transformed pattern;
combining the transformed patterns together in said graphics card so that the raster image contains both of the transformed patterns, and the graphics card outputs the raster image as a digital video signal to the image input of the digital projector such that the digital projector projects light of both of the transformed patterns as spotlights simultaneously in the same digital projector.

19. The method of claim 18, wherein the pattern pixels of the raster image are at least 50% brighter than the pattern-free pixels of the raster image.

* * * * *